United States Patent [19]

Fujikawa et al.

[11] Patent Number: 5,248,412

[45] Date of Patent: Sep. 28, 1993

[54] PROCESS FOR PRODUCING CATALYST COMPOSITION FOR USE IN HYDRODESULFURIZATION OF HYDROCARBON OIL AND PROCESS FOR HYDRODESULFURIZING HYDROCARBON OIL

[75] Inventors: Takashi Fujikawa, Saitama; Kazushi Usui, Chiba; Katsuyoshi Ohki, Saitama, all of Japan

[73] Assignees: Cosmo Research Institute; Cosmo Oil Co., Ltd., both of Tokyo, Japan

[21] Appl. No.: 826,044

[22] Filed: Feb. 20, 1992

Related U.S. Application Data

[62] Division of Ser. No. 677,177, Mar. 29, 1991, Pat. No. 5,137,859.

[30] Foreign Application Priority Data

Mar. 30, 1990 [JP] Japan .................................. 2-83372

[51] Int. Cl.$^5$ ............................................. C10G 45/08
[52] U.S. Cl. ................................. 208/216 R; 208/213; 208/217; 208/299
[58] Field of Search ................... 208/213, 216 R, 217, 208/299

[56] References Cited

U.S. PATENT DOCUMENTS 3,116,234 12/1963 Douwes et al. ................. 208/208 R
3,536,632 10/1970 Kroll ................................. 502/107

*Primary Examiner*—Theodore Morris
*Assistant Examiner*—Walter D. Griffin
*Attorney, Agent, or Firm*—Sughrue, Mion, Zinn, Macpeak & Seas

[57] ABSTRACT

A process is described for producing a catalyst composition for hydrodesulfurization of hydrocarbon oil, which comprises:
drying and calcining a carrier comprising alumina or an alumina-containing material impregnated with a solution mixture of
(A) at least one of an alkoxide, a chelate compound, or a glycoxide of molybdenum or chromium;
(B) at least one of an alkoxide, a chelate compound, or a glycoxide of cobalt or nickel; and
an organic solvent capable of dissolving (A) and (B).

Also described is a process for hydrodesulfurizing hydrocarbon oil using the same catalyst composition.

16 Claims, 1 Drawing Sheet

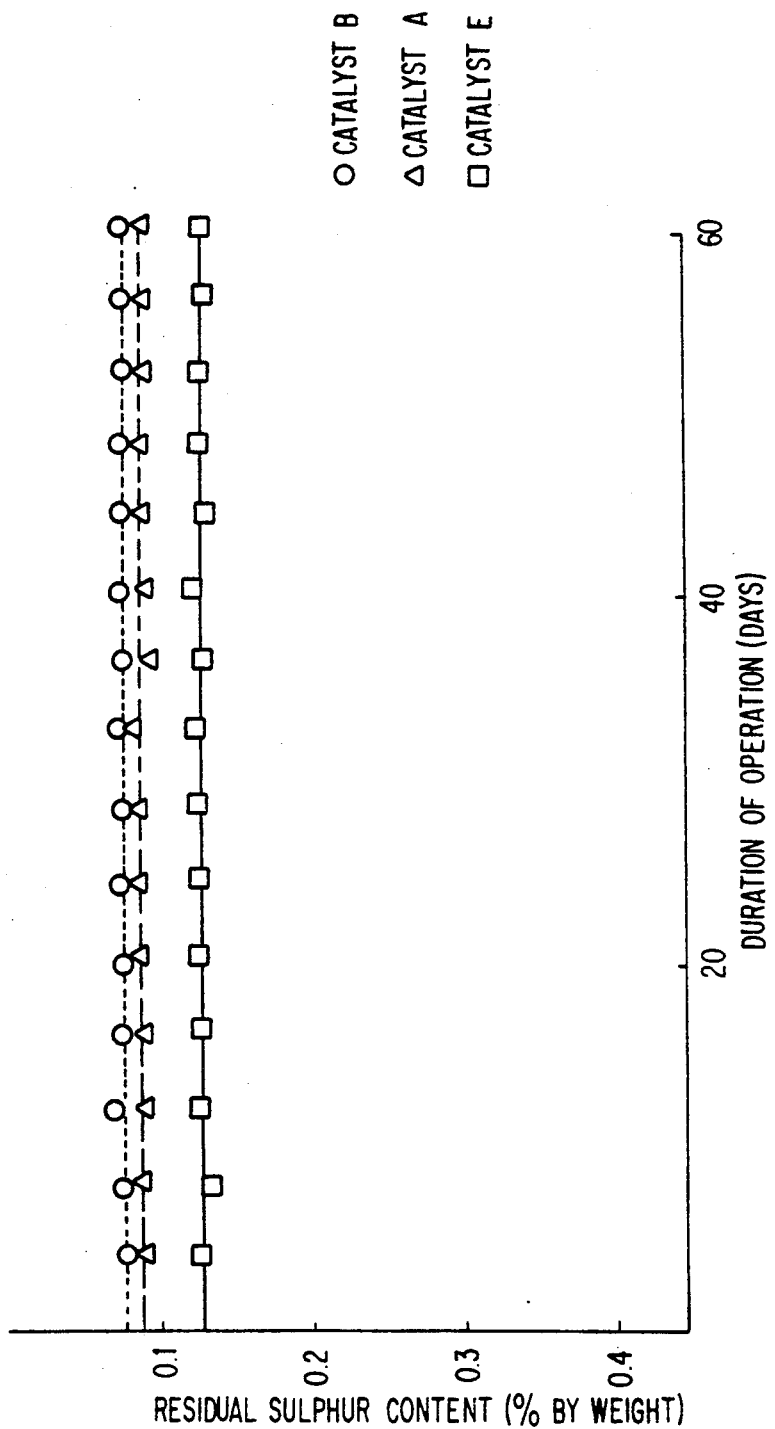

PROCESS FOR PRODUCING CATALYST COMPOSITION FOR USE IN HYDRODESULFURIZATION OF HYDROCARBON OIL AND PROCESS FOR HYDRODESULFURIZING HYDROCARBON OIL

This is a divisional of application Ser. No. 07/677,177, filed Mar. 29, 1991, now U.S. Pat. No. 5,137,859.

FIELD OF THE INVENTION

The present invention relates to a process for producing a hydrodesulfurization catalyst composition particularly improved in desulfurizing activity, and a process for desulfurizing hydrocarbon oil using the hydrodesulfurizing catalyst composition thus obtained.

BACKGROUND OF THE INVENTION

Hydrocarbon oil generally contains sulfur compounds that, when hydrocarbon oil is used as a fuel, sulfur incorporated therein in sulfur compounds is converted into sulfur oxides and is discharged into the atmosphere. It is preferred, from the viewpoint of reducing air pollution which is caused by combustion of hydrocarbon oil, to reduce the sulfur content of such hydrocarbon oil to a level as low as possible. This can be achieved by subjecting the hydrocarbon oil to a catalytic hydrodesulfurization process (HDP).

Since environmental pollution problems such as acid rain and nitrogen oxides ($NO_x$) are of great concern worldwide, the removal of the sulfur component from oil at the present technological level is still insufficient. It is, in fact, possible to further reduce the sulfur content of hydrocarbon oil to some extent by operating the HDP under more severe conditions, for example, by controlling the LHSV, temperature, and pressure. HDP under such severe conditions, however, produces carbonaceous deposits on the surface of the catalyst, which, in turn, causes an abrupt drop in catalyst activity. The problem is even worse with a light fraction hydrocarbon oil, since HDP operated under severe conditions adversely influences, for example, on the color hue stability and storage stability of the oil. It can be seen that improvements in operating conditions are only effective to a certain extent, and more substantial improvements must be sought in the development of catalysts considerably increased in catalyst activity.

Hydrodesulfurization catalysts were conventionally produced by methods such as the so-called "impregnation process", which comprises impregnating a carrier with an aqueous solution having dissolved therein a salt of a metal belonging to Group VIII of the Periodic Table (sometimes referred to simply as a "Group VIII metal", hereinafter, and in the same way for a metal belonging to Group VIB of the Periodic Table) and a salt of a Group VIB metal, and, after drying, calcining the metal-impregnated carrier; the so-called "coprecipitation process" which comprises adding an aqueous solution of a salt of a Group VIB metal and an aqueous solution of a salt of a Group VIII metal to an aqueous solution having dispersed therein alumina or a gel thereof to effect coprecipitation of a metal compound; and the so-called "kneading process" which comprises kneading, while heating, a paste mixture composed of alumina or a gel thereof, an aqueous solution containing a salt of a Group VIB metal, and an aqueous solution containing a salt of a Group VIII metal, to remove water therefrom. For reference, see Ozaki, ed., *Shokubai Chousei Kagaku* (Catalyst Preparation Chemistry), pp. 250 to 252, published by Kodansha Scientific.

None of the aforementioned methods, however, are suitable for uniformly dispersing a relatively large amount of metal compounds in and on the carrier.

With respect to desulfurization processes using a conventional catalyst, for example, the catalytic hydrodesulfurization of a gas oil containing 1.3% by weight of sulfur carried out at a liquid hourly space velocity of 4 $hr^{-1}$, at a reaction temperature of 350° C., and at a reaction pressure of 35 $kg/cm^2G$, such a process yields, at best, an oil where the sulfur content has been reduced to a value in the range of from about 0.13 to about 0.19% by weight.

As another example, in the case of a vacuum gas oil (VGO) initially containing 2.50% by weight of sulfur, catalytic hydrodesulfurization at a liquid hourly space velocity of 0.4 $hr^{-1}$, a reaction temperature of 350° C., and at a reaction pressure of 52 $kg/cm^2G$ yields a VGO oil the sulfur content of which is reduced only to an insufficient degree, with the limit being in the range of from about 0.15 to about 0.18% by weight.

As a further example, a topped crude having a 3.8% by weight sulfur content obtained from a crude oil results in a product the sulfur content of which is lowered, but the result is limited to the range of from about 0.9 to about 1.0% by weight, after catalytic hydrodesulfurization at a liquid hourly space velocity of 1.0 $hr^{-1}$, at a reaction temperature of 361° C. and at a reaction pressure of 150 $kg/cm^2G$.

It is desired, therefore, to obtain more readily and without performing the HDP under severe operating conditions, a light gas oil where the sulfur content by weight is reduced to a value in the range of from about 0.05 to about 0.08%, and, similarly, a VGO and a topped crude which have a reduced sulfur content in the range of from about 0.08 to about 0.10% and from about 0.7 to about 0.8%, respectively. If this would be possible, not only would such a process be greatly advantageous from the economical viewpoint in increasing the life of the catalyst but also the resulting oil products would be effective for avoiding air pollution.

An object of the present invention is to provide a catalyst having highly dispersed therein active metals, which catalyst exhibits extremely high desulfurization activity under ordinary operating conditions such that severe process conditions can be excluded.

Another object of the present invention is to provide a fuel oil less apt to cause air pollution due to a reduced amount of sulfur compounds contained therein so that the discharge thereof at combustion may be minimized.

SUMMARY OF THE INVENTION

The present inventors, after conducting intensive and extensive studies to overcome the aforementioned problems, successfully developed a catalyst considerably increased in hydrodesulfurization activity as compared with conventional catalysts. That is, the catalyst according to the present invention was reached based on the findings that effective active metals can be highly dispersed throughout the surface of the carrier, and that this dispersed state can be maintained in a stable manner for a long period of time. The reason for such advantageous properties is not yet clear, but it is believed to be ascribable to a production process which is different from those used for conventional desulfurization catalysts. That is, in a conventional process for producing a catalyst, a metal having catalytic activity (referred to simply hereinafter as an "active metal") interacts with the carrier to form the active component at the site the carrier is impregnated with the active metal, but in the process according to the present invention such interaction does not occur. This is because the compounds used in the present invention such as alkoxide, etc., do not contain a functional group which participates in the reaction with alumina. In the process according to the present invention, the carrier is first impregnated with a chelate compound, an alkoxide, or a glycoxide of the active metal which is then decomposed in a calcining step carried out after the impregnation step. In such a process, the active metal can be gradually formed and can thus be effectively dispersed throughout the surface of the carrier.

The present invention relates, firstly, to a process for producing a catalyst composition for the hydrodesulfurization of hydrocarbon oil, which comprises:

drying and calcining a carrier comprising alumina or an alumina-containing material impregnated with a solution of (A) at least one member selected from the group consisting of an alkoxide, a chelate compound, and a glycoxide of molybdenum or chromium; (B) at least one selected from the group consisting of an alkoxide, a chelate compound, and a glycoxide of cobalt or nickel; and an organic solvent capable of dissolving (A) and (B).

The present invention relates, secondly, to a process for hydrodesulfurizing hydrocarbon oil using the catalyst composition thus obtained.

BRIEF DESCRIPTION OF THE DRAWING

The FIGURE shows the change in residual sulfur with the passage of time in the hydrodesulfurization of gas oil using catalyst compositions A, B, and E.

DETAILED DESCRIPTION OF THE INVENTION

The process for producing the catalyst composition according to the present invention for use in the hydrodesulfurization of hydrocarbon oil is now explained in detail.

The molybdenum or chromium alkoxides or the cobalt or nickel alkoxides for use in the present invention may be those commercially available or those produced by the Ziegler process. The metal alkoxides comprise alkoxyl groups having, preferably, from 1 to 4 carbon atoms, more preferably, 2 or 3 carbon atoms. Examples of the preferred alkoxides are molybdenum ethoxide and cobalt isopropoxide.

The chelate compounds of molybdenum or chromium or the chelate compounds of cobalt or nickel for use in the present invention may be those commercially available or those prepared by reacting a chelating agent such as an alkyl acetoacetate and acetyl acetone with metal alkoxides, to thereby effect a partial or complete substitution of the RO-groups (where R represents an alkyl group containing from 1 to 4 carbon atoms) of the metal alkoxides, for example, cobalt isopropoxide. It is preferred to use acetylacetonates of those metals, such as molybdenum oxide acetylacetonate, chromium acetylacetonate, cobalt acetylacetonate, and nickel acetylacetonate.

The glycoxide used in the present invention is a reaction product of a diol and an active metal. The diols are, for example, ethylene glycol, propylene glycol, trimethylene glycol, butanediol, pentanediol, hexanediol, heptanediol, octanediol, diethylene glycol, triethylene glycol, etc. The diol preferably contains 2 to 10 carbon atoms. These glycoxides can be obtained by reaction with a sulfate or nitrate, etc., of molybdenum, chromium, cobalt or nickel.

In the solution comprising (A) at least one compound selected from the group consisting of an alkoxide, a chelate compound, and a glycoxide of molybdenum or chromium (referred to simply hereinafter as "A-compounds"); (B) at least one compound selected from the group consisting of an alkoxide, a chelate compound, and a glycoxide of cobalt or nickel (referred to simply hereinafter as "B-compounds"); and an organic solvent capable of dissolving (A) and (B), the organic solvent used include alcohols, ethers, ketones, and aromatic compounds, each having from 1 to 18 carbon atoms. It is preferred that the alcohol contains 1 to 18 carbon atoms, the ether or ketone contains 2 to 18 carbon atoms, and the aromatic compound contains 6 to 18 carbon atoms. Preferred among them are, for example, methanol, ethanol, n-propanol, isopropanol, n-butanol, isobutanol, ethylene glycol, acetone, hexanol, benzene, toluene, xylene, diethyl ether, tetrahydrofuran, and dioxane, which may be used either singly or as a combination of two or more thereof.

The organic solvent is used in an amount equivalent to the pore volume of the carrier, and in the organic solvent the A-compounds and the B-compounds are dissolved. Alternatively, the A- and B-compounds may first be dissolved in an excess amount of the organic solvent to give the desired solution and the carrier is immersed therein and thereafter excess solvent is removed by filtering or drying.

The solution is prepared by stirring in a conventional manner, but should be sufficiently stirred to obtain a homogeneous solution at an ambient temperature at atmospheric pressure. The stirring is conducted, preferably, in the temperature range of from about 20° to about 300° C., more preferably, in the range of from about 50° to about 200° C., for a duration of from about ten and several minutes to about 1 hour, in general. In impregnation method, the concentration of (A) component metal is preferably about 0.6 to about 7.0 mol/l, (B) component metal is preferably about 0.3 to about 5.0 mol/l.

The carrier comprising alumina or alumina-containing material is then impregnated with the resulting solution, and is then dried and calcined to obtain the catalyst according to the present invention.

The alumina for use as the carrier preferably is γ-alumina, X-alumina, η-alumina, or a mixture of two or more thereof. The alumina-containing material is a composition comprising alumina and other carrier materials, such as refractory inorganic oxides. Examples of such alumina-containing materials are those comprising alumina and at least one material selected from silica, magnesia, calcium oxide, zirconia, titania, boria, and hafnia. The compounding ratio is from about 0 to about 50% in carrier basis.

The alumina or the alumina-containing material may be produced from a water-soluble compound such as a water-soluble aluminum compound. More specifically, examples of such water-soluble aluminum compounds are aluminum sulfate, aluminum chloride, aluminum nitrate, and alkali metal aluminates. To incorporate silica, a water-soluble silicon compound may be used. Suitable water-soluble silicon compounds are, for example, alkali metal silicates (preferably those containing $Na_2O$ and $SiO_2$ at the $Na_2O:SiO_2$ ratio of from 1:2 to 1:4), tetraalkoxysilane, and orthosilicates. Such water-soluble compounds of aluminum and silicon are used as aqueous solutions with an appropriate concentration thereof. The alumina-containing silica carrier, or other alumina-containing carriers comprising materials other than silica, are preferably produced by a coprecipitation process, but also useful are the deposition and the gel-mixing processes.

The alumina or the alumina-containing silica carrier suitable for use in the hydrodesulfurization may be produced, for example, by a process which comprises:

preparing a solution by adding an alkali metal hydroxide solution to an acidic aqueous solution of aluminum or an alkali metal aluminate solution (preferably containing aluminum at a concentration of from about 0.3 to about 2 mole/l);

heating the resulting solution to a temperature in the range of from about 50° to about 98° C. while controlling the pH in the range of from 6.0 to 11.0 and adding thereto an aqueous solution of an alkali silicate, if necessary;

controlling the pH in the range of from about 6.0 to about 11.0, preferably in the range of from about 8.0 to about 10.5, to thereby form a hydrogel or a hydrosol; or, alternatively, controlling the pH to obtain an appropriate pore distribution by properly adding aqueous ammonia, nitric acid, acetic acid, or the like; and heating the suspension to a temperature in the range of from about 50° to about 98° C. and maintaining it in that temperature range for at least 2 hours.

Upon completion of the aforementioned treatment, the precipitate is filtered and washed with ammonium acetate and water to thereby remove ions present as impurities. The resulting product is then finished as a carrier by effecting conventional treatments such as drying and calcining.

Drying is conducted by heating the precipitate in the temperature range of from room temperature to about 150° C. either in the presence or absence of oxygen (in the presence of inert gas). Calcining is subsequently carried out by heating the dried product to a temperature range of from about 200° C. to about 800° C. under an oxygen containing atmosphere for one hour to several days.

The active metal components to be incorporated in the carrier are (a) either or both of molybdenum and chromium, and (b) either or both of cobalt and nickel. For hydrodesulfurizing hydrocarbon oil, it is preferred to use the above in combinations such as molybdenum - cobalt, molybdenum - nickel, and molybdenum - cobalt - nickel.

With respect to incorporating the active metal components in the carrier, the A-compounds may be first incorporated as a solution mixture with an organic solvent which dissolves the A-compounds, and thereafter the B-compounds may be incorporated as a solution mixture dissolved in an organic solvent which dissolves the B-compounds. The process may also be conducted in the reverse order by first incorporating the B-compounds and then the A-compounds, or, alternatively, (A) and (B) compounds may be incorporated at the same time. The impregnation may be carried out be any conventional process which is appropriate, such as by a spray-impregnation method which comprises spraying on the particles of the carrier a solution having dissolved therein the active metal components; a method which comprises immersing the carrier into a relatively large amount of the impregnating solution; and a multi-step impregnation process which comprises repeatedly contacting the carrier with the impregnation solution.

The active metal components is present or carried in an amount of from about 5 to about 25% by weight, more preferably, from 8 to 18% by weight, in terms of oxide, of molybdenum and/or chromium with respect to the total catalyst; and from about 1 to 15% by weight, more preferably, from 2 to 10% by weight, in terms of oxide, of cobalt and/or nickel with respect to the total catalyst.

The catalyst may be of any shape as desired, and may be cylindrical, granular, or in tablet form. Catalysts finished in the shape as desired may be obtained by extrusion molding, granulation, or the like. Length can optionally be selected from those as are conventionally used in the art.

The carrier impregnated with the active metal components and separated from the impregnation solution is then subjected to washing with water, drying, and calcining. The drying and the calcining are both carried out under the same conditions as those under which the carrier or precipitate was previously treated. In the hydrodesulfurization of a hydrocarbon oil, it is preferred that the catalyst is pre-sulfurized prior to its practical use.

Sulfurization treatment includes, for example, gas sulfurization by $H_2S$, liquid sulfurization by LGO, etc. and hydrogen. As one example, sulfurization is conducted by 5% $H_2S$ and 95% $H_2$ at about 150° C. to about 700° C. for 2 hours under normal pressure.

The catalyst thus obtained according to the present invention has favorable properties sufficient for the hydrodesulfurization of a hydrocarbon oil, that is, which has fine pores about 40 to about 200 Å in diameter and has a specific pore volume of from 0.4 to 0.9 ml/g, and also that it has a specific surface area of from about 200 to about 400 $m^2/g$, and when molded into a cylinder about 0.5 to about 3.0 mm in diameter and about 3.2 to about 3.6 mm in length, it has a bulk density of from about 0.5 to about 1.0 g/ml, and a clashing strength at the side of the catalyst of from about 0.8 to about 3.5 kg/mm.

The catalyst according to the present invention may be used as a mixture with a known catalyst or a known inorganic oxide carrier in the use thereof.

Hydrocarbon oils which can be hydrosulfurized according to the present invention include the light fraction obtained by topping or by vacuum distillation of crude oil, topping residue, and vacuum residue. They also include coker gas oil, solvent deasphalted oil, oil extracted from tar sand or oil shale, and product oil from the liquefaction of coal.

In a process operating on a commercial scale, the desulfurizing apparatus for carrying out the catalytic hydrogenation treatment comprises a conventional reactor which can be used in the fixed bed, moving bed or fluidized bed form with respect to the catalyst particles. To carry out the desulfurization, as desired, the oil to be desulfurized charged into the reactor is subjected to high temperature and high pressure conditions under a considerably high hydrogen partial pressure. In a typical desulfurization, the catalyst is maintained in the fixed bed form and the oil to be treated is allowed to pass over the bed. The catalyst may be charged in a single reactor, or may be distributed in two or more continuous reactors. When the starting oil is a heavy oil, it is strongly preferred that a multistage reactor be used.

When a fixed bed is used, it is preferred that the catalyst is used in a molded form. The catalytic reaction preferably is carried out in the temperature range of about 200° to about 500° C., more preferably in the range of from 250° to 400° C., and at a liquid hourly space velocity in the range of about 0.05 to about 5.0 hr$^{-1}$, more preferably, in the range of from about 0.1 to about 4.0 hr$^{-1}$, under a hydrogen pressure in the range of about 30 to about 200 kg/cm$^2$G, and more preferably, in the range of from about 35 to about 150 kg/cm$^2$G.

The process for producing the catalyst according to the present invention is relatively simple, yet, the specific desulfurizing activity thereof as obtained from the rate coefficient calculated under a constant reaction condition is considerably high as compared with those of conventional desulfurizing catalysts. More specifically, for example, in the case of a gas oil (containing 1.3% by weight of sulfur), the sulfur content of the product oil which has been subjected to treatment with the catalyst according to the present invention was reduced to a very low 0.08% by weight, as compared with that of 0.15% by weight at best of a product oil produced using a conventional process. Similarly, VGO (containing 2.5% by weight of sulfur) was reduced in sulfur content to a low 0.09% by weight as compared with the conventional 0.16% by weight; and a heavy oil (containing 3.8% by weight of sulfur) was reduced in sulfur content to 0.7% by weight as compared with the conventional 0.9% by weight.

The present invention is now illustrated in further detail by referring to the following Examples and Comparative Examples, but it should be understood that the present invention is not to be construed as being limited thereto. Unless otherwise indicated, all percents and parts in the following examples are by weight. All catalysts were formed at atmospheric pressure and in the air unless otherwise described.

EXAMPLE 1

Preparation of Catalyst

A solution comprising 100 ml of isopropanol having dissolved therein 95.493 g (0.29278 mole) of molybdenum oxide acetylacetonate and 54.972 g (0.18750 mole) of cobalt acetylacetonate was stirred at 80° C. for one hour in an Erlenmeyer flask. To this solution was charged 37.45 g of alumina (comprising substantially γ-alumina (cylindrical shape, 1.5 mm in diameter×3 mm in length)) having a specific pore volume of 0.712 ml/g and specific surface area of 336 m$^2$/g, and stirring was conducted at 80° C. for 1 more hour. The excess solution was filtered off and the solvent was removed by evaporation at 100° C. for one hour in air. The resulting product was heat treated in a muffle furnace at 500° C. for 4 hours to obtain a (CoO-MoO$_3$)-on-Al$_2$O$_3$ catalyst (CoO-MoO$_3$/Al$_2$O$_3$ catalyst; Catalyst A) containing 8.4% CoO, 10.9% MoO$_3$, and 80.7% Al$_2$O$_3$, having a specific surface area of 274 m$^2$/g and a specific pore volume of 0.5621 ml/g.

EXAMPLE 2

Preparation of Catalyst

A solution comprising 100 ml of benzene having dissolved therein 93.953 g (0.29278 mole) of molybdenum ethoxide and 33.318 g (0.18750 mole) of cobalt isopropoxide was stirred at 80° C. for one hour in an Erlenmeyer flask. To this solution was charged 37.45 g of the same alumina as was used in Example 1, and stirring was conducted at 80° C. for 1 more hour. The excess solution was filtered off and the solvent was removed by evaporation at 100° C. The resulting product was heat treated in a muffle furnace at 500° C. for 4 hours to obtain a CoO-MoO$_3$/Al$_2$O$_3$ catalyst (Catalyst B) containing 7.5% CoO, 14.9% MoO$_3$, and 77.6% Al$_2$O$_3$, having a specific surface area of 261 m$^2$/g and a pore volume of 0.5244 ml/g.

EXAMPLE 3

Preparation of Catalyst

A solution comprising 100 ml of sec-butanol having dissolved therein 95.493 g (0.29278 mole) of molybdenum oxide acetylacetonate and 54.972 g (0.18750 mole) of cobalt acetylacetonate was stirred at 80° C. for one hour in an Erlenmeyer flask. To this solution was charged 37.45 g of the same alumina as was used in Example 1, and stirring was conducted at 80° C. for 1 more hour. The excess solution was filtered off and the solvent was removed by evaporation at 100° C. The resulting product was heat treated in a muffle furnace at 500° C. for 4 hours to obtain a CoO-MoO$_3$/Al$_2$O$_3$ catalyst (Catalyst C) containing 7.8% CoO, 11.2% MoO$_3$, and 81.0% Al$_2$O$_3$, having a specific surface area of 270 m$^2$/g and a specific pore volume of 0.5544 ml/g.

EXAMPLE 4

Preparation of Catalyst

A solution comprising 50 ml of ethylene glycol and 50 ml of isopropanol as solvents having dissolved therein 95.493 g (0.29278 mole) of molybdenum oxide acetylacetonate and 54.568 g (0.1875 mole) of cobalt (I) nitrate hexahydrate was stirred at 80° C. for one hour in an Erlenmeyer flask. To this solution was charged 37.45 g of the same alumina as was used in Example 1, and stirring was conducted at 80° C. for 1 more hour. The excess solution was filtered off and the solvent was removed by evaporation at 200° C. The resulting product was heat treated in a muffle furnace at 500° C. for 4 hours to obtain a CoO-MoO$_3$/Al$_2$O$_3$ catalyst (Catalyst D) containing 6.4% CoO, 12.1% MoO$_3$, and 81.5% Al$_2$O$_3$, having a specific surface area of 266 m$^2$/g and a specific pore volume of 0.552 ml/g.

COMPARATIVE EXAMPLE

In a flask there was prepared a solution by dissolving 4.7 g of ammonium para-molybdate in 14.5 ml of ion exchanged water, and in the resulting solution there was immersed 20 g of an alumina carrier having a specific pore volume of 0.7123 ml/g and a specific surface area of 336 m$^2$/g. After immersion for a duration of 1 hour, the carrier was removed from the solution, air dried at 120° C. for 2 hours, and calcined at 500° C. for 10 hours in a muffle furnace and in air. The carrier was then immersed in an aqueous solution containing 5 g of cobalt(I) nitrate hexahydrate dissolved in 14.5 ml of ion exchanged water, to thereby obtain a carrier carrying cobalt. The cobalt-carrying carrier was air dried and calcined at 500° C. for 10 hours to obtain a catalyst containing 5% CoO, 15% MoO$_3$, and 80% Al$_2$O$_3$ (Catalyst E) having a specific surface area of 266 m$^2$/g and a specific pore volume of 0.5478 ml/g.

The composition for each of catalysts A to E is given in Table 1 below.

TABLE 1

| | Starting Material | Solvent | Catalyst Composition | Specific Surface Area (m²/g) | Specific Pore Volume (ml/g) | |
|---|---|---|---|---|---|---|
| Example 1 | Cobalt (II) Acetylacetonate<br>Molybdenum Oxide Acetylacetonate | Isopropanol | CoO (8.4)<br>MoO₃ (10.9)<br>Al₂O₃ (80.7) | 274 | 0.56 | A |
| Example 2 | Cobalt Isopropoxide<br>Molybdenum Ethoxide | Benzene | CoO (7.5)<br>MoO₃ (14.9)<br>Al₂O₃ (77.6) | 261 | 0.52 | B |
| Example 3 | Cobalt (II) Acetylacetonate<br>Molybdenum Oxide Acetylacetonate | sec-Butanol | CoO (7.8)<br>MoO₃ (11.2)<br>Al₂O₃ (81.0) | 270 | 0.55 | C |
| Example 4 | Cobalt Nitrate<br>Molybdenum Oxide Acetylacetonate | Ethylene Glycol<br>Isopropanol | CoO (6.4)<br>MoO₃ (12.1)<br>Al₂O₃ (81.5) | 266 | 0.55 | D |
| Comparative Example 1 | Conventional Catalyst (prepared by impregnating a carrier with an inorganic metal salt) | | CoO (5)<br>MoO₃ (15)<br>Al₂O₃ (80) | 266 | 0.55 | E |

Each of catalysts A to E prepared in Examples 1 to 4 and the Comparative Example was used for hydrodesulfurization of light gas oil (LGO), vacuum gas oil (VGO), and heavy oil under the following operating conditions, whereafter each of the catalysts was evaluated according to the methods as follows.

Hydrodesulfurization of Gas Oil

Raw material: LGO (Specific gravity (15/4° C.): 0.851; Sulfur content: 1.35%; Nitrogen content: 200 ppm; Viscosity (at 30° C.): 5.499 cSt.)

Reaction conditions: Temperature: 350° C.; Hydrogen Pressure: 35 kg/cm²; Hydrogen/Hydrocarbon oil ratio: 600 Nm³/Kl; Liquid hourly space velocity: 4 hr⁻¹; Apparatus: Fixed-bed type high pressure flow reactor; Catalyst: Catalysts A, B, C, D, and E.

Evaluation method: The sulfur content of the product oil after operating the reaction under the above conditions for 100 hours or for 60 days was analyzed. The results obtained after 100 hours are given in Table 2. The figure gives the changes in residual sulfur with the passage of time for Catalysts A, B, and E.

TABLE 2

| Run No. | 1 | 2 | 3 | 4 | 5 |
|---|---|---|---|---|---|
| Catalysts | A | B | C | D | E |
| Sulfur content (weight %) | 0.09 | 0.08 | 0.09 | 0.09 | 0.13 |

Hydrodesulfurization of VGO

Raw material: VGO (Specific gravity (15/4° C.): 0.916; Sulfur content: 2.53%; Nitrogen content: 780 ppm; Viscosity (at 50° C.): 28.8 cSt.)

Reaction conditions: Temperature: 350° C.; Hydrogen Pressure: 52 kg/cm²; Hydrogen/Hydrocarbon oil ratio: 600 Nm³/Kl; Liquid hourly space velocity: 0.4 hr⁻¹; Apparatus: Fixed-bed type high pressure flow reactor; Catalyst: Catalysts A, B, C, D, and E.

Evaluation method: The sulfur content of the product oil after operating the reaction under the above conditions for 100 hours was analyzed. The results are given in Table 3.

TABLE 3

| Run No. | 6 | 7 | 8 | 9 | 10 |
|---|---|---|---|---|---|
| Catalysts | A | B | C | D | E |
| Sulfur content (weight %) | 0.11 | 0.09 | 0.10 | 0.10 | 0.15 |

Hydrodesulfurization of Heavy Oil

Raw material: Topped crude (Specific gravity (15/4° C.): 0.956; Sulfur content: 3.77%; Asphaltene content: 3.9%; Vanadium content: 48 ppm; Nickel content: 14 ppm) obtained from a crude oil from Kuwait Reaction conditions: Temperature: 361° C.; Hydrogen Pressure: 150 kg/cm²; Hydrogen/Hydrocarbon oil ratio: 830 Nm³/kl; Hydrogen concentration: 90 mole %; Liquid hourly space velocity: 1.0 hr⁻¹; Apparatus: Fixed-bed type high pressure flow reactor; Catalyst: Catalysts A, B, C, D, and E.

Evaluation method: The sulfur content of the product oil after operating the reaction under the above conditions for 100 hours was analyzed. The results are given in Table 4.

TABLE 4

| Run No. | 11 | 12 | 13 | 14 | 15 |
|---|---|---|---|---|---|
| Catalysts | A | B | C | D | E |
| Sulfur content (weight %) | 0.81 | 0.71 | 0.76 | 0.75 | 0.93 |

While the invention has been described in detail and with reference to specific embodiments thereof, it will be apparent to one skilled in the art that various changes and modifications can be made therein without departing from the spirit and scope thereof.

What is claimed is:

1. A process for hydrodesulfurizing hydrocarbon oil, which comprises bringing the hydrocarbon oil into contact with a catalyst composition obtained by a process which consists essentially of:

drying and calcining, the calcining being in the presence of oxygen, a carrier comprising alumina or an alumina-containing material impregnated with a solution which consists essentially of (A) a least one member selected from the group consisting of an alkoxide, a chelate compound, and a glycoxide of molybdenum or chromium;

(B) at least one member selected from the group consisting of an alkoxide, a chelate compound, and a glycoxide of cobalt or nickel; and an organic solvent capable of dissolving (A) and (B).

2. The process for hydrodesulfurizing hydrocarbon oil as claimed in claim 1, wherein the molybdenum or chromium alkoxide or the cobalt or nickel alkoxides comprise alkoxyl groups having from 1 to 4 carbon atoms.

3. The process for hydrodesulfurizing hydrocarbon oil as claimed in claim 1, wherein the molybdenum or chromium alkoxides or the cobalt or nickel alkoxides comprise alkoxyl groups having 2 or 3 carbon atoms.

4. The process for hydrodesulfurizing hydrocarbon oil as claimed in claim 1, wherein the alkoxides are molybdenum ethoxide and cobalt isopropoxide.

5. The process for hydrodesulfurizing hydrocarbon oil as claimed in claim 1, wherein the chelate compounds are molybdenum oxide acetylacetonate, chromium acetylacetonate, cobalt acetylacetonate, or nickel acetylacetonate.

6. The process for hydrodesulfurizing hydrocarbon oil as claimed in claim 1, wherein the glycoxides are molybdenum glycoxide, chromium glycoxide, cobalt glycoxide, or nickel glycoxide.

7. The process for hydrodesulfurizing hydrocarbon oil as claimed in claim 1, wherein the organic solvent is an alcohol, an ether, a ketone, or an aromatic compound, each having from 1 to 18 carbon atoms.

8. The process for hydrodesulfurizing hydrocarbon oil as claimed in claim 7, wherein the organic solvent is methanol, ethanol, n-propanol, isopropanol, n-butanol, isobutanol, ethylene glycol, acetone, hexanol, benzene, toluene, xylene, diethyl ether, tetrahydrofuran, or dioxane, which may be used either singly or as a combination of two or more thereof.

9. The process for hydrodesulfurizing hydrocarbon oil as claimed in claim 1, wherein the alumina-containing material comprises alumina and at least one member selected from the group consisting of silica, magnesia, calcium oxide, zirconia, titania, boria, and hafnia.

10. The process for hydrodesulfurizing hydrocarbon oil as claimed in claim 1, wherein the catalyst carries, with respect to the total catalyst, molybdenum or chromium in an amount of from about 5 to about 25% by weight in terms of oxides, and cobalt or nickel in an amount of from about 1 to about 15% by weight in terms of oxides.

11. The process for hydrodesulfurizing hydrocarbon oil as claimed in claim 10, wherein said hydrodesulfurizing is carried out at the following conditions:
at a temperature in the range of from about 200° to about 500° C., at a liquid hourly spaced velocity in the range of about 0.05 to about 5.0 $hr^{-1}$ and under a hydrogen pressure in the range of about 30 to about 200 $kg/cm^2G$.

12. The process for hydrodesulfurizing hydrocarbon oil as claimed in claim 1, wherein the catalyst carries, with respect to the total catalyst, molybdenum or chromium in an amount of from about 8 to about 18% by weight in terms of oxides, and cobalt or nickel in an amount of from about 2 to about 10% by weight in terms of oxides.

13. The process for hydrodesulfurizing hydrocarbon oil as claimed in claim 1, wherein the hydrocarbon oil is selected from the group consisting of the light fraction obtained by topping or by vacuum distillation of crude oil, topping residue, vacuum residue, coker gas oil, solvent deasphalted oil, oil extracted from tar sand or oil shale, and product oil from liquefaction of coal.

14. A process for hydrodesulfurizing hydrocarbon oil, which is characterized by bringing the hydrocarbon oil into contact a catalyst composition at a temperature in the range of from about 200° to about 500° C., at a liquid hourly space velocity in the range of about 0.05 to about 5.0 $hr^{-1}$ and under a hydrogen pressure in the range of about 30 to about 200 $kg/cm^2G$, wherein said catalyst composition is produced by the process which consists essentially of the steps:
drying and calcining, the calcining being in the presence of oxygen, a carrier comprising alumina or an alumina-containing material impregnated with a solution which consists essentially of
  (A) at least one member selected from the group consisting of an alkoxide, a chelate compound, and a glycoxide of molybdenum or chromium;
  (B) at least one member selected from the group consisting of an alkoxide, a chelate compound, and a glycoxide of cobalt or nickel; and
an organic solvent capable of dissolving (A) and (B).

15. A process for hydrodesulfurizing hydrocarbon oil, which is characterized by bringing the hydrocarbon oil into contact a catalyst composition at a temperature in the range of from about 250° to about 400° C., at a liquid hourly space velocity in the range of about 0.1 to about 4.0 $hr^{-1}$ and under a hydrogen pressure in the range of about 35 to about 150 $kg/cm^2G$, wherein said catalyst composition is produced by the process which consists essentially of the steps:
drying and calcining, the calcining being in the presence of oxygen, a carrier comprising alumina or an alumina-containing material impregnated with a solution which consists essentially of
  (A) at least one member selected from the group consisting of an alkoxide, a chelate compound, and a glycoxide of molybdenum or chromium;
  (B) at least one member selected from the group consisting of an alkoxide, a chelate compound, and a glycoxide of cobalt or nickel; and
an organic solvent capable of dissolving (A) and (B).

16. The process of claim 15, wherein the catalyst carries, with respect to the total catalyst, molybdenum or chromium in an amount of from about 5 to about 25% by weight in terms of oxides, and cobalt or nickel in an amount of from about 1 to about 15% in terms of oxides.

* * * * *